(12) United States Patent
Shetty et al.

(10) Patent No.: US 10,921,141 B2
(45) Date of Patent: Feb. 16, 2021

(54) GEO-TAGGED MOBILE NETWORK INFORMATION FOR INTELLIGENT NAVIGATION

(71) Applicant: Intel Corporation, Santa Clara, CA (US)

(72) Inventors: Arjun R. Shetty, Bangalore (IN); Shrinidhi Ramachandra, Ka (IN); Anikethan R. V, Mysuru (IN)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 15/814,830

(22) Filed: Nov. 16, 2017

(65) Prior Publication Data

US 2019/0041227 A1 Feb. 7, 2019

(51) Int. Cl.
   *G01C 21/34* (2006.01)
   *G05D 1/02* (2020.01)
   *H04W 4/18* (2009.01)
   *H04W 4/024* (2018.01)

(52) U.S. Cl.
   CPC ..... *G01C 21/3461* (2013.01); *G01C 21/3492* (2013.01); *G05D 1/0285* (2013.01); *H04W 4/185* (2013.01); *G01C 21/3415* (2013.01); *H04W 4/024* (2018.02)

(58) Field of Classification Search
   CPC ............ G01C 21/3461; G01C 21/3492; G01C 21/3415; G05D 1/0285; H04W 4/185; H04W 4/024
   See application file for complete search history.

(56) References Cited

U.S. PATENT DOCUMENTS

| | | | |
|---|---|---|---|
| 2010/0153001 A1* | 6/2010 | Bauchot | G01C 21/3461 701/533 |
| 2015/0172908 A1* | 6/2015 | Hadinata | H04W 48/16 455/421 |
| 2016/0080228 A1* | 3/2016 | Suga | H04L 43/0823 370/252 |
| 2016/0371985 A1* | 12/2016 | Kotecha | B64C 39/024 |
| 2019/0094884 A1* | 3/2019 | Aitken | G01C 21/00 |

OTHER PUBLICATIONS

Tim Hultman et al., "Connectivity-optimal Shortest Paths Using Crowdsourced Data", 2016, 6 pages, the Third International Workshop of Crow Assisted Sensing Pervasive Systems and Communciations, http://ieeexplore.ieee.org/document/7457106/, retrieved Feb. 22, 2018.

* cited by examiner

*Primary Examiner* — Thomas E Worden
(74) *Attorney, Agent, or Firm* — Schwabe, Williamson & Wyatt, P.C.

(57) ABSTRACT

In embodiments, an apparatus for providing wireless connectivity based routing for a vehicle may include a user interface to receive one or more wireless connectivity preferences and a navigation request from a user and to display a recommended route to a destination for the user, the recommended route to meet the one or more wireless connectivity preferences while the vehicle follows the recommended route to the destination. The apparatus may further include a local database to store geotagged wireless connectivity data for various geolocations, collected by one or more geotagged wireless connectivity scanners of the vehicle, and a route determination engine coupled to the user interface and to the local database to determine the recommended route, wherein the user interface, the local database and the route determination engine are disposed in the vehicle.

21 Claims, 13 Drawing Sheets

| GPS Co-ordinate | GERAN | EUTRAN | UTRAN | Avg data rates | Call drop % | Other Statistics (is EMBMS supported? is Voice over IP supported? etc) |
|---|---|---|---|---|---|---|
| x1, y1 | FALSE | TRUE | TRUE | 1Mbit/sec | 4 | TRUE, TRUE |
| x2, y2 | TRUE | FALSE | FALSE | 1Kbit/sec | 0 | TRUE, FALSE |
| ⋮ | | | | ⋮ | ⋮ | |

FIG. 4

| | RAT availability | | | VOPS | EMBMS | Signal Strength | | | | % of Call drops | Data rates (kbps) | | | |
|---|---|---|---|---|---|---|---|---|---|---|---|---|---|---|
| | 2G | 3G | 4G | NR | | | 2G | 3G | 4G | NR | | 2G | 3G | 4G | NR |
| X1, Y1 | N | Y | Y | | Y | Y | NA | M | S | | 10 | NA | 400 | 3000 | |
| X2, Y2 | Y | Y | Y | | Y | Y | M | M | M | | 0 | 20 | 400 | 4000 | |
| X3, Y3 | Y | Y | Y | | Y | Y | M | S | M | | 0 | 20 | 300 | 3000 | |
| X4, Y4 | Y | N | Y | | Y | Y | S | NA | S | | 0 | 30 | NA | 6000 | |
| X5, Y5 | Y | N | Y | | N | Y | S | NA | S | | 0 | 20 | NA | 5000 | |
| X6, Y6 | N | Y | Y | | N | N | NA | M | M | | 50 | NA | 400 | 8000 | |
| X7, Y7 | Y | Y | Y | | Y | Y | M | M | NA | | 30 | 30 | 300 | 1000 | |
| X8, Y8 | Y | N | Y | | N | N | M | NA | NA | | 0 | 30 | NA | 2000 | |

Legends : Signal strength := S : Strong ; M : Moderate ;

FIG. 5

GEO-TAGGED MOBILE NETWORK INFORMATION FOR INTELLIGENT NAVIGATION

FIELD

Embodiments of the present disclosure relate to wireless communications and computer-assisted driving, and in particular to geo-tagging and storing wireless connectivity information to improve route navigation.

BACKGROUND

Navigation systems are generally limited to finding a best route between an origination point and a destination point. The best route obtained is typically a function of distance, travel time, or type of roadway used (well paved, interstate highway, toll-free, etc.).

BRIEF DESCRIPTION OF THE DRAWINGS

FIG. 4 depicts an example geo-tagged database in accordance with various embodiments.

FIG. 5 depicts an alternate geo-tagged database in accordance with various embodiments.

DETAILED DESCRIPTION

Figure 1:
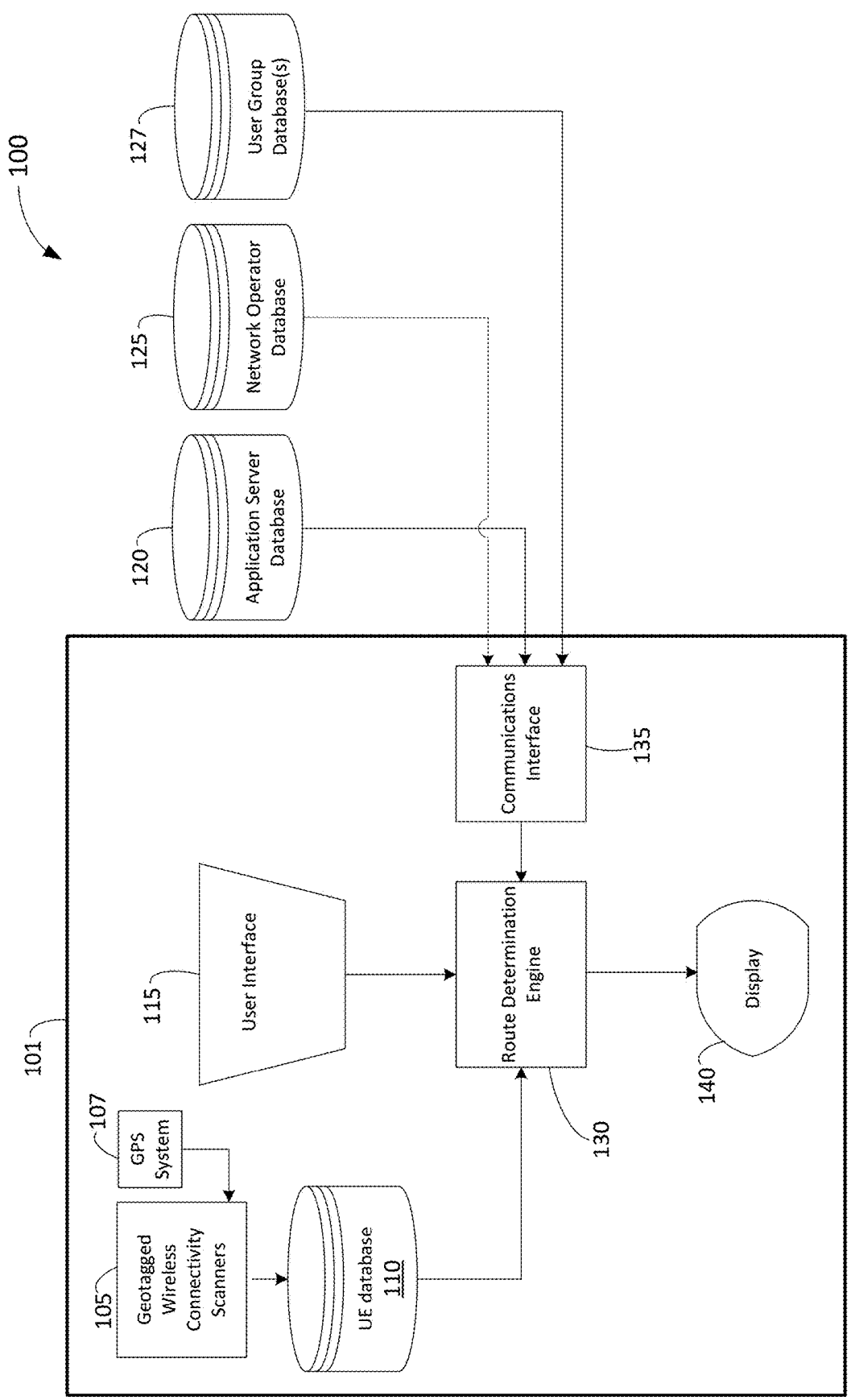
FIG. 1 depicts a system for wireless connectivity based routing, according to various embodiments.

In embodiments, an apparatus for providing wireless connectivity based routing for a vehicle may include a user interface to receive one or more wireless connectivity preferences and a navigation request from a user and to display a recommended route to a destination for the user, the recommended route to meet the one or more wireless connectivity preferences while the vehicle follows the recommended route to the destination. The apparatus may further include a local database to store geotagged wireless connectivity data for various geolocations, collected by one or more geotagged wireless connectivity scanners of the vehicle, and a route determination engine coupled to the user interface and to the local database to determine the recommended route, wherein the user interface, the local database and the route determination engine are disposed in the vehicle. In embodiments, the apparatus may further include the one or more geotagged wireless connectivity scanners.

In embodiments, the apparatus may further include a communications interface, coupled to the route determination engine, to obtain wireless connectivity data for the various geolocations or other geolocations from one or more remote databases. In embodiments, the one or more remote databases may include databases maintained by an application server, databases provided by communications network operators, or user group databases.

In embodiments, the apparatus may be a navigation system disposed in a vehicle having a user interface, the local database and the route determination engine.

In embodiments, the geotagged wireless connectivity scanner may acquire data continuously, or at a pre-determined frequency. Or, for example, the geotagged wireless connectivity scanner may obtain data as to a given route or road segment initially continuously, and after a pre-defined quantity of data has been acquired for that route or road segment, periodically. In embodiments, a user interface of the apparatus may further receive user commands regarding data acquisition parameters for the geotagged wireless connectivity scanner. In embodiments, the data acquisition parameters may include, for example, when to operate the geotagged wireless connectivity scanner, which routes to operate it on, how often to update the data, and minimum quantity of data acquired in order to stop continuous data acquisition, or any combination of these.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the terms "module", "user interface", "route determination engine", "communications interface", "navigation system", and/or "geotagged wireless connectivity scanner", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

As used herein, the term semi-autonomous driving is synonymous with computer-assisted driving. The term does not mean exactly 50% of the driving functions are automated. The percentage of automated driving functions may vary between 0% and 100%. In addition, it will be appreciated the hardware, circuitry and/or software implementing the semi-autonomous driving may temporarily provide no automation, or 100% automation, such as in response to an emergency situation. For ease of illustration, the following non-limiting example use cases for mobile devices and autonomous vehicles are relevant to, and addressed by, various embodiments of the invention. In a first example, an executive travelling from his office to his home, or vice-versa, needs to be connected to his office Virtual Private Network (VPN) so as to attend an important presentation which may last during the entire duration of his travel. He needs to ensure that he travels by a route that can offer consistent quality of data services throughout the duration of his journey.

In a second example, a person starting out on a drive expects to receive a call due to a possible emergency, e.g., with his children who may be away from home. The call may come any time during his travel, and he cannot miss it. Such a person needs to insure that he may be reached by phone at any time during the duration of the drive.

Finally, in a third example, a person using an Evolved Multimedia Broadcast Multicast Services (EMBMS) capable device wants to be able to watch a live program during his auto-travel, and therefore wants to ensure that he travels on a route where the network supports this capability.

In each of the above use cases, intelligence across multiple components in a mobile device, or a computer-assisted/autonomous vehicle (e.g., user preferences, current modem capabilities, and historical data for specific GPS coordinates) needs to be integrated and analyzed in order to be able to provide the best user experience. In each of these use cases, a user/traveler is more concerned with wireless connectivity along his route than he is about distance of travel or even travel time. Thus, conventional in-vehicle navigation systems, which calculate route guidance based on travel time, or travel time adjusted for toll roads or high quality roads, simply do not provide the needed answers.

In embodiments, a local database may be created that is custom made, based on the UE (which is understood herein (and in the claims) to include a mobile device, an autonomously driven vehicle computer, controller or control system, or a semi-autonomously driven vehicle computer, controller or control system) and network capabilities, and that can be updated dynamically based on any changes in either of these. In embodiments, the local database may be used to address use cases such as those described above to determine an recommended route between a starting point and an ending point, where several alternatives are available.

It is here noted that, in embodiments, locally stored database information is not just cell strength data, which may change dynamically. Rather, in embodiments, a local database may contain network or connectivity statistics that include, for example, support of specific services as well as radio conditions based on repeated iterations for the UE, which may not be very dynamic.

In embodiments, a local database may be built on, or communicably connected to, a UE that tags GPS locations with relevant mobile network statistics. Such mobile network statistics may include absence of call drops, better data rates, support of IMS Voice over packet switched domain (PS), support of EMBMS, etc.

In embodiments, the local database may be built by continuous learning of the UE/autonomous vehicle as and when a user travels along any area. In embodiments, information from the database may be used in connection with navigation applications, and, based on user preferences, make use of specific parameters to choose a best route. In such embodiments, systems or apparatuses according to various embodiments may ride on top of an existing navigation program or device. For example, both may be provided in a head unit in a vehicle. Alternatively, systems and apparatus according to various embodiments may be integrated with, or in, a navigation system as a single product or unit. Or, still alternatively, systems or apparatuses according to various embodiments may be provided in a mobile UE, such as a smartphone or the like, which may also be provided with a navigation application.

It is here noted that after a certain point in time, as to many routes normally travelled by a user, the database essentially is complete. Once that has occurred, in embodiments, as a power saving measure, a user may suspend the data gathering functionality for such routes, and may only have the UE acquire wireless connectivity data for new, or less traveled routes. Moreover, in embodiments, the data scanning functionality may be periodically turned on, even on well traveled routes, either manually, at some defined period, or both.

It is noted that use of a local database to store and access wireless connectivity data has significant advantages over alternate possible solutions, such as, for example, obtaining certain mobile network parameters from a cloud based crowd sourcing server. Some of these advantages are next described.

As regards reliability of data for a specific UE, it is noted that a crowd sourced platform may be based on collating data from all configurations of UE's. As a result, in a field scenario, considering the variety of UE configurations and types on the market, there may be marked differences in the performance of different devices under similar network conditions. Thus, decisions taken based on such data may not be the best fit for a specific UE when compared to using data that has been locally stored by the UE itself. Additionally, it may be possible (and in rural areas, highly likely) that data for the route that is frequently traversed by the user is simply not available in an online database.

It is also noted that as regards dependence of a UE on connectivity to a server to obtain wireless connectivity routing data, in a cloud based database arrangement, the need to retrieve data from a server makes a UE dependent on data connectivity. For example, a UE may be on an active voice call in a 2G network, making it impossible for the same UE to retrieve data from a network, thereby hampering decision making. This is because most networks are not Dynamic Synchronous Transfer Mode (DTM) networks, and thus do not support simultaneous voice and PS data communications. Accessing a local database for decision making removes this limitation.

Thus, there may be significant benefits in using a "tailor-made" to a given UE database. It is noted that services that a given UE may access can depend on both the UE's capabilities and network capabilities. Thus, a locally stored database, targeted to a relevant UE's capabilities, enhances its decision making capabilities. For example, a UE that supports IP Multimedia Subsystem or IP Multimedia Core Network Subsystem (IMS) (an architectural framework for delivering IP multimedia services) services may choose to store information related to availability of IMS voice services of the network along a given route. On the other hand, however, a UE that does not support IMS may just store and use data related to 2G/3G networks when deciding upon a route for making a voice call. Or, as still another example, a UE that is EMBMS capable may store parameters related to the availability of these services at various geographic locations. Given a user's need to use such services during navigation, in embodiments, an example system may dynamically factor in these parameters to decide on the best route.

In embodiments, systems and apparatuses may be provided in user driven vehicles as well as in autonomous, or partially autonomous, driving vehicles. In the autonomous driving vehicle case, having a local database that is more granular, and that stores more information, improves decision making, whereas Open Platform based data tends to limit the inputs to decision making algorithms to available data sets. It is noted that although these limitations apply to other types of devices as well, it is particularly significant in an autonomous vehicle use case. This is because an autonomous vehicle would typically be able to meet the storage and processing requirements of a local database easily, having capabilities that are different from an average mobile phone (so Open Platform statistics matching its capabilities is less likely) as well as gain from the quicker access to a local database as opposed to fetching data from a server.

Finally, a locally created and stored database allows for dynamic updating. Thus, when a new feature/NR (New Radio Access Technology (RAT) is introduced in the network, or, for example, in cases where a new subscription introduced by a network operator is added to the UE, having to depend on a crowd sourced platform to collate the data and to support the new features not only takes time, but also may not always happen. Whereas a local database can be immediately updated with the new capabilities and data can be gathered, thus insuring that the UE is able to start making decisions based on the new parameters.

It is noted that current navigation solutions do not integrate GPS, crowd sourced platforms, and local storage of mobile network statistics in the UE itself. This limits the UE's choices as well as its user's experience.

In what follows, integration of the currently disjoint statistics available from GPS, crowd sourced platforms and other third party platforms, as well as local storage of mobile network statistics in a UE, and making use of this collated information to provide more choices and better user experience during navigation, will be described.

In embodiments, a database may be built which tags mobile network statistics with the GPS locations at which they are acquired, where the network statistics are both granular and may include many parameters. In embodiments, the information from the database may be used to map to navigation applications. In embodiments, collated data form various sources may be used to decide on specific routes to be taken depending on a user's current preference for wireless connectivity and communications during the duration of travel, such as, for example, EMBMS, voice calls, packet based data communications, etc.

FIG. 1 illustrates an example system for wireless connectivity based routing, according to various embodiments. With reference thereto there is shown system 101, which may be provided in a vehicle. As noted, a vehicle may be user driven, or may be partially or completely autonomously driven. System 101 may be also provided in a standalone UE, which may be removably docked in a vehicle. System 101 may include one or more geotagged wireless connectivity scanners 105, which may measure, scan or otherwise obtain various wireless connectivity parameters on a route, and may access GPS locational data from GPS system 107 so as to store the acquired parameters, in a geotagged manner, in UE database 110. Continuing with reference to FIG. 1, system 101 may also include user interface 115, by which a user may enter their wireless connectivity preferences. It is here noted that the term "wireless connectivity preferences" includes any aspect of en route wireless connectivity that may be of interest or value to a user, and a preferred value, maximum value, minimum value, or acceptable range of values, for each aspect. In embodiments, the wireless connectivity preferences may include, for example, type of network (e.g., 2G, 3G, 4G, NR), signal strength, maximum call drop rate, data rates, support of IMS Voice over packet switched domain (VOPS), support of EMBMS, or the like. In embodiments, the preferences may be generally expressed as Very Good, Normal, Unimportant, with the system mapping the general expression to a set of wireless connectivity requirements.

Additionally, user interface 115 may further receive user commands regarding data acquisition parameters for geotagged wireless connectivity scanners 105. In embodiments, such data acquisition parameters may include when to operate the geotagged wireless connectivity scanner, which routes to operate it on, how often to update the data, and minimum quantity of data acquired in order to stop continuous data acquisition, or any combination of these.

In embodiments, user wireless connectivity preferences may further include a preferred minimum average data rate throughout a route, priority of preferred access technology during the journey, minimum failures encountered values (call drops/loss of network/handover failures, etc.) during, or availability of certain services.

Continuing with further reference to FIG. 1, system 101 may further optionally include communications interface 135, which may interact with cloud based databases, such as, for example, application server database 120, which may be maintained, for example, by an application provider (i.e., of an application provided to users according to various embodiments), and network operator database 125, which may be maintained, for example, by a communications network serving one or more geographical areas, including highways, roads and routes.

It is noted that application server database 120 may be maintained by the application provider, who, in embodiments, may provide a mechanism for UEs using the application to upload data. In embodiments, the format in which such data is uploaded may include sufficient information to allow for compartmentalization based on the uploading UE's capabilities. Thus, in embodiments, when a different UE seeks to access or download data from application server database 120, that UE may only access or download data from UEs with similar capabilities, thus making the data, and its recommended routing decisions based on such data, more relevant.

Continuing with further reference to FIG. 1, system 101 may further communicate with user group database 127. User group database 127 may be optionally provided by an application provider to users, in various embodiments, based on capabilities of similar UEs, to exchange connectivity data amongst members of the group. It is noted that because this is a user group, users may be provided flexibility as to how the data is stored, and how it may be used. Additionally, such a user group may provide data security, and the fact that the members of the group have UEs having similar capabilities may also insure accuracy of any data obtained from user group database 127. As an example of such a group, users who have modems which support latest configurations, such as, for example, MIMO/EMBMS, or the like, may form groups and share their respective local databases 110 to collate data.

Thus, continuing with reference to FIG. 1, communications interface 135 may interact with these and other cloud based databases to supplement the information stored in UE database 110. Finally, system 101 may include route determination engine 130, which may, in embodiments, take as inputs: data from UE database 110, user preferences from user interface 115, and optionally, as noted, data from cloud based databases obtained via communications interface 135. Using these inputs, route determination engine 130 may generate a recommended route for the vehicle, which may be displayed to a user via display 140.

It is noted that, in embodiments, geotagged wireless connectivity scanners 105 may acquire, and UE database 110 may include, essential mobile network related statistics such as availability of network or specific type of network, availability of certain services in network, absence or presence of call drops, and at what percentages, data rates, and the like. In embodiments, each of these variables may be tagged at several GPS locations.

Thus, in embodiments, information accessed by geotagged wireless connectivity scanners 105 may include statistics locally obtained or collated by the UE, such as, for example, by polling its modem. It is here noted that modems typically provide numerous statistics to their applications for various purposes, including diagnostics, detection of interference, etc. Thus, providing the required statistics to an application, apparatus or system running on or associated with the UE may, in embodiments, be straight forward. Thus, in embodiments, an application may collate this information, and, based on interaction with a GPS system 107, create a database, such as UE database 110, of mobile network statistics as computed by the modem in association with the GPS co-ordinates.

Finally, in embodiments, customizations such as, for example, turning on database creation only for required or repeated routes, may also be implemented to optimize power consumption. In such embodiments, a user may be given the flexibility of when and where to turn on and off the data acquisition feature as well as the choice to restrict use of the database to applications of his or her choice.

As noted, in embodiments, the UE database may be integrated with navigation applications, such as route determination engine 130. In embodiments, this engine may be an enhanced navigation application provided on the UE, or it may be provided in a separate navigation system in a vehicle, and communicably connected to UE database 110 and user preference settings module 115. Alternatively, route determination engine 130 may run on top of an existing navigation system, or a navigation application running on the UE.

Figure 2:
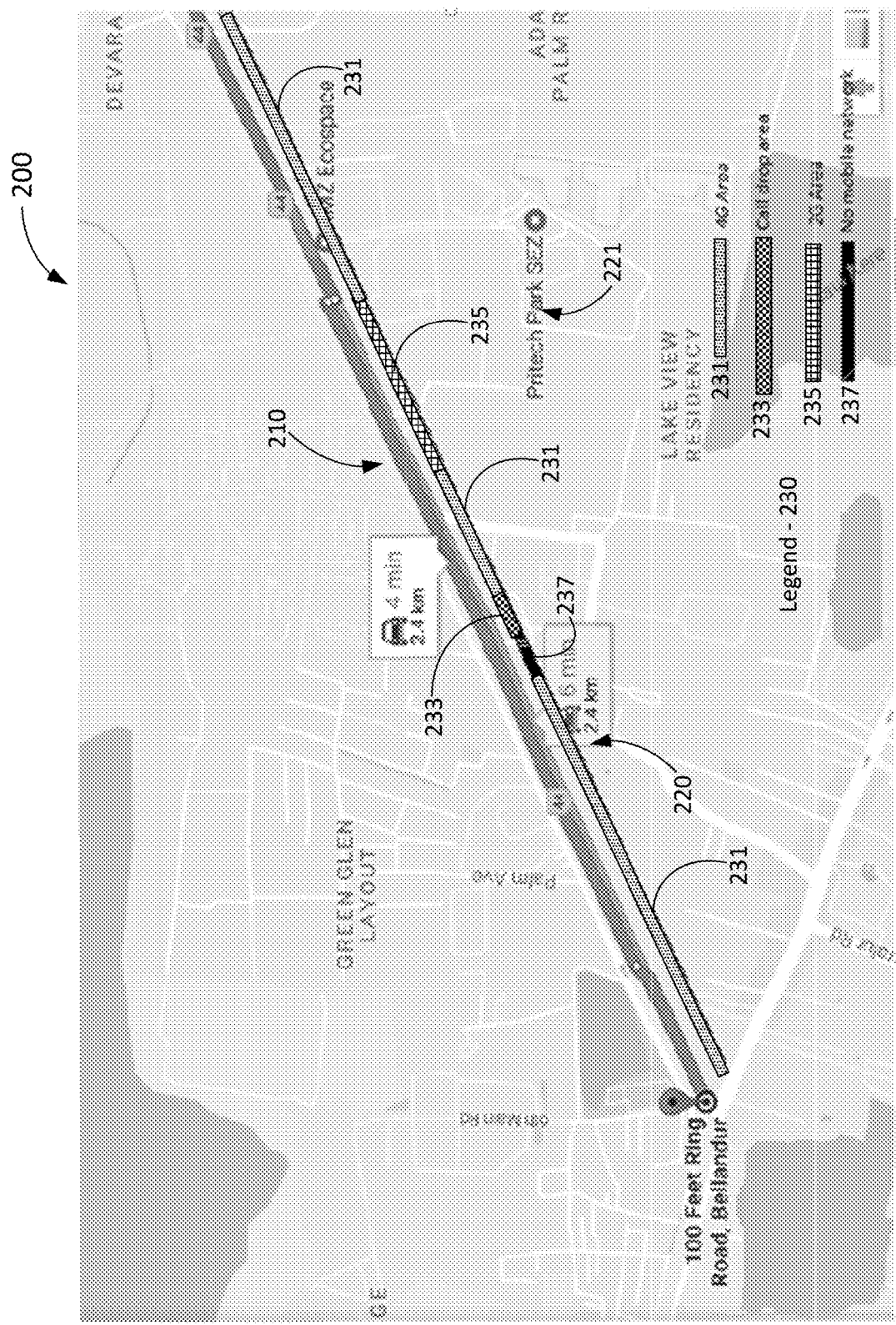
FIG. 2 depicts a comparison of an example map displayed to a user showing a conventional route depiction with traffic/congestion data and an alternate route depiction with wireless connectivity data in accordance with various embodiments.

FIG. 2 illustrates a comparison of a standard route diagram 210 as determined and displayed to a user by a conventional navigation system, and an example of a route diagram 220 according to various embodiments. As can be seen in FIG. 2, route diagram 220 presents information to a user regarding wireless connectivity. As shown in route diagram 220, as read in connection with legend 230, most segments of route 220 are supported by a 4G network, as shown by 4G segments 231. Further, a middle section of route 220 above "Pritech Park SEZ" 221 is only supported by a 2G network, as shown by 2G network segment 235 of route 220. There is a portion of route 220 which is a call drop area 233, and next to it is a small segment with no mobile network, as indicated by the black line 237 which indicates (as shown in Legend 230) "No mobile network." Thus, unlike traffic congestion or average speeds as shown in conventional route diagrams such as 210, in embodiments, route diagrams such as 220 may depict the wireless connectivity along a given route. It is noted that route diagram 220 is for illustrative purposes only, and that the coverage shown does not reflect the actual wireless network coverage available on the depicted route. In embodiments, additional details and options may be provided for each route, and wireless connectivity data may be provided for all available routes between two points.

Figure 3:
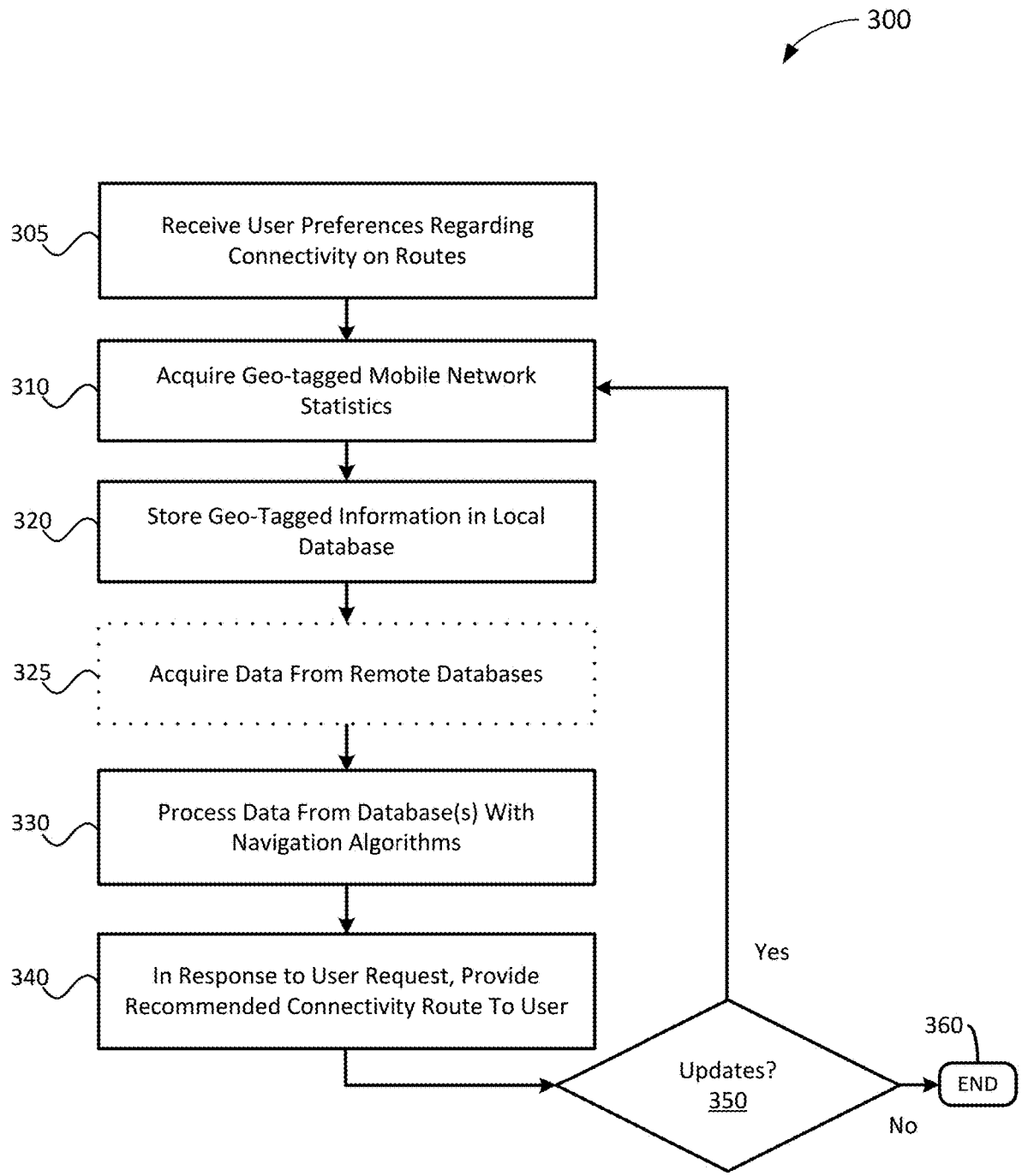
FIG. 3 illustrates an overview of the operational flow of a process for acquiring and storing wireless connectivity data in accordance with various embodiments.

With reference to FIG. 3, an overview of the operational flow of a process for acquiring and storing wireless connectivity data in accordance with various embodiments is presented. Process 300 may be performed by a system or apparatus according to various embodiments. Process 300 may include blocks 305 through 360. In alternate embodiments, process 300 may have more or less operations, and some of the operations may be performed in different order.

Process 300 may begin at block 305, where an example apparatus may receive user preferences regarding connectivity on routes. As noted above, in embodiments, user preferences may include type of network (e.g., 2G, 3G, 4G, NR), signal strength, maximum call drop rate, data rates, support of IMS Voice over packet switched domain (VOPS), support of EMBMS, preferred minimum average data rate throughout a route, priority of preferred access technology during a journey, or maximum allowed failures (call drops/loss of network/handover failures, etc.) during the travel.

From block 305, process 300 may proceed to block 310, where mobile network statistics may be acquired and tagged with a GPS location. In embodiments, such statistics may include, for example, some or all of the data fields in each row of FIG. 5. It is noted that, in embodiments, in block 310 geotagged wireless connectivity data may be obtained or acquired continuously, or at a pre-determined frequency. Or, for example, in embodiments, the geotagged wireless connectivity data may be obtained, as to a given route or road segment, initially continuously, and after a pre-defined quantity of data has been obtained for that route or road segment, periodically.

It is further noted that, as noted above, in embodiments, user commands regarding data acquisition parameters for geotagged wireless connectivity data may be received from a user, and such commands may include, as to one or more routes or roadways, one or more of: whether to operate the geotagged wireless connectivity scanner, when to operate the geotagged wireless connectivity scanner, and spatial frequency of data points. When such data acquisition parameters are received, geotagged wireless connectivity data may be obtained in block 310 according to such parameters.

From block 310, process 300 may proceed to block 320, where the geotagged mobile network statistics acquired in block 310 may be stored in a local database. From block 320, process 300 may optionally proceed to block 325, where additional data may be acquired from remote (cloud based) databases, such as databases 120, 125 and 127, as shown in FIG. 1. It is here reiterated, as noted above with reference to FIG. 1, in embodiments, only a local UE database need be created, and route determinations may be made, in such embodiments, based on wireless connectivity information in the local database and user preferences. In other embodiments, to supplement a local database, data from cloud based databases may also be accessed. In such embodiments, Process 300 would proceed to block 325, where updated navigation application data may be obtained, such as, for example, road information, or for example, mobile network information may be obtained, such as average signal strengths, supported services, etc.

From block 320, or block 325, as the case may be, process 300 may proceed to block 330, where wireless connectivity data from the local database, and possibly additional databases, may be processed with navigation algorithms. As noted above in connection with Route Determination Engine 130 of FIG. 1, this processing may occur in an enhanced navigation application that uses wireless connectivity data in its route calculations, or, for example, it may occur by an example system or apparatus, such as system 101 in FIG. 1, calling a basic navigation system, such as, for example, Google Maps®, to obtain basic route information, and then further process the basic route information received with additional algorithms using the wireless connectivity data from the local, and optionally cloud based, databases.

Finally, from block 330, process 300 may proceed to block 340, where an recommended route, taking into account the geotagged data, optionally third party server data, and the user preferences, may be provided to a user. For example, the recommended route may be provided on a display in a vehicle, with details as to specific regions of connectivity along it, as shown in FIG. 2.

Because network data may change, from block 340 process 300 may proceed to query block 350, where it may be determined if there are updates available to any of the data sources. If "Yes" at query block 350, then process 300 may return to block 310 and repeat blocks 310 through 340.

However, if "No" at query block 350, then process 300 may proceed to block 360, where process 300 may terminate.

FIG. 4 illustrates a simple example illustrating the beginnings of a UE database according to various embodiments. As seen, there are two rows, corresponding to two data points, one at GPS co-ordinate x1, y1 and the other at GPS co-ordinate x2, y2. For each data point various wireless connectivity fields are provided, such as which type of network is supported at each location, GERAN (GSM EDGE Radio Access Network), UTRAN (Universal Terrestrial Radio Access Network) or EUTRAN (Evolved Universal Terrestrial Radio Access Network), what the average data rate is, the call drop percentage, and other statistics, such as here, for example, which services are supported, such as VOPS and EMBMS.

In actual embodiments, a database may be populated with significantly larger number of data points to allow for meaningful decision making between possible routes that each connect a start point and an end point. An example database with eight data points, spread out in space so as to create four alternate paths between a start position and an end position, is provided in FIG. 5, and the individual data points listed in the database of FIG. 5 are laid out in each of FIGS. 6-10, all next described. It is understood that FIGS. 4 and 5 each show only the beginnings of a database according to various embodiments, and are merely to illustrate exemplary formats that may be used.

Referring now to FIG. 5, database 500 contains wireless connectivity data for eight geographic data points, X1, Y1 through X8, Y8. As shown, for each data point there are several data fields, namely Radio Access Technology (RAT) availability 510 (i.e., which type of network is supported), whether VOPS is supported 520, whether EMBMS is supported 530, signal strength 540 for each supported network type, percentage of call drops 550, and data rates 560 for each type of network supported. Finally, as shown in the legend at the bottom of FIG. 5, signal strength 540 has two values: strong, and moderate.

Figure 6:
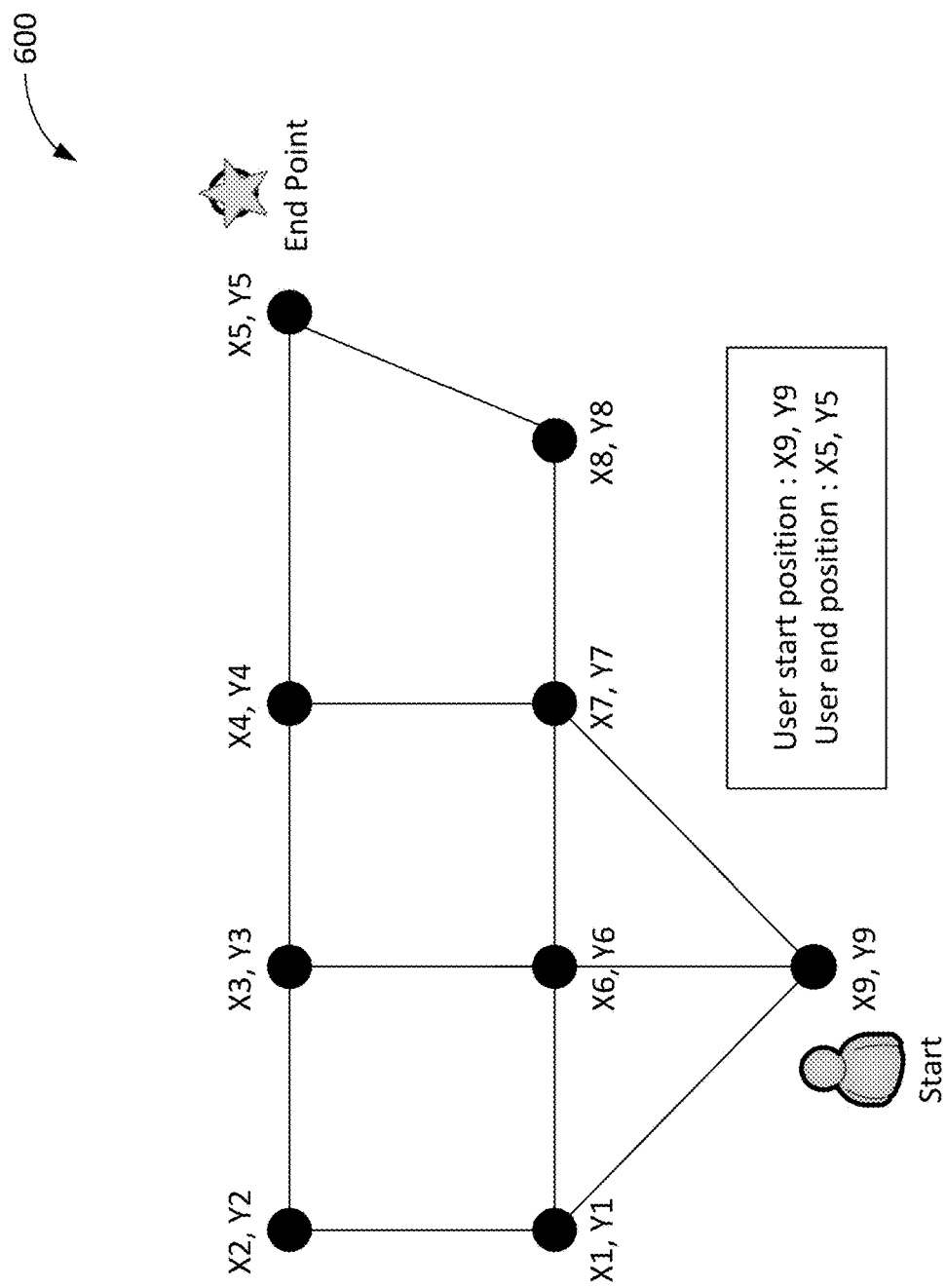
FIG. 6 depicts an example set of alternate routes from a starting position to an ending position, for which data is available in the example database of FIG. 5, in accordance with various embodiments.

As noted, the eight data points listed in database 500 of FIG. 5 are plotted in space in each of FIGS. 6-10. Referring now to FIG. 6, one may consider X9, Y9 as the Start Point, and X5, Y5 as the End Point. However, this designation is arbitrary, and a given route may be charted between any two of the points shown in FIG. 6. Given the Start Point and End Point designations in FIG. 6, there are four possible paths between X9, Y9 and X5, Y5. Three of these follow the three-way split at X9, Y9, to each of, from left to right, X1,Y1, X6,Y6 and X7, Y7. From X7,Y7 the path also bifurcates, leaving two possibilities, vertically to X4,Y4, or horizontally to X8,Y8. Each of these four paths has advantages and disadvantages, depending upon the interplay between user preferences and wireless connectivity data as collated in database 500 of FIG. 5. These are next described.

Figure 7:
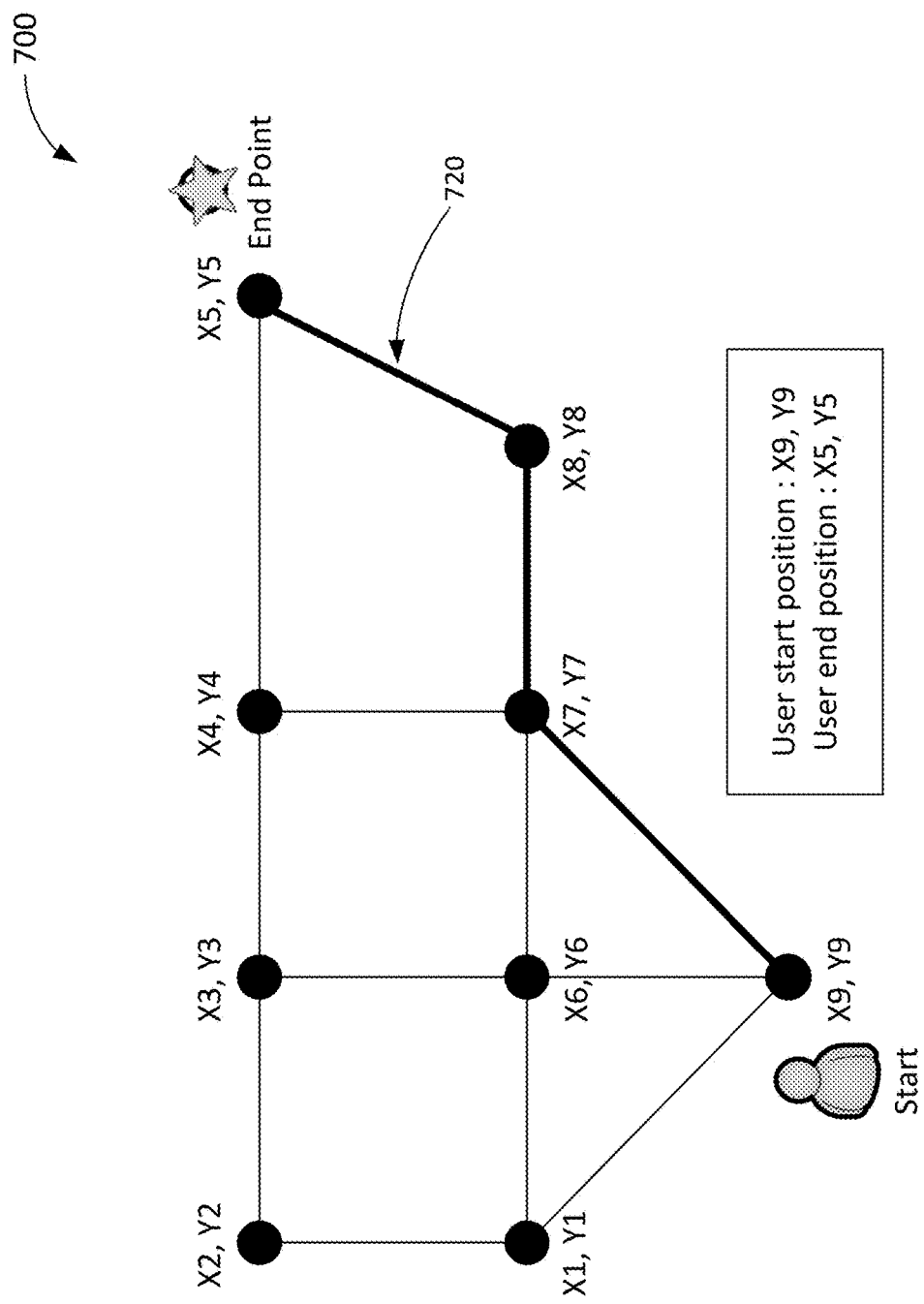
FIG. 7 depicts the shortest route between the starting position and the ending position of FIG. 6 in accordance with various embodiments.

Referring now to FIG. 7, the fourth possible path 720 is chosen, and thus shown in bold. Path 720 represents the shortest route between the Start Point X9,Y9, and the End Point X5,Y5. It is here noted that a route segment shown in database 500 of FIG. 5 is the route segment that ends on the listed data point. Thus, for example route segment X1,Y1 is the segment that begins at X9,Y9 and ends at X1,Y1.

Figure 8:
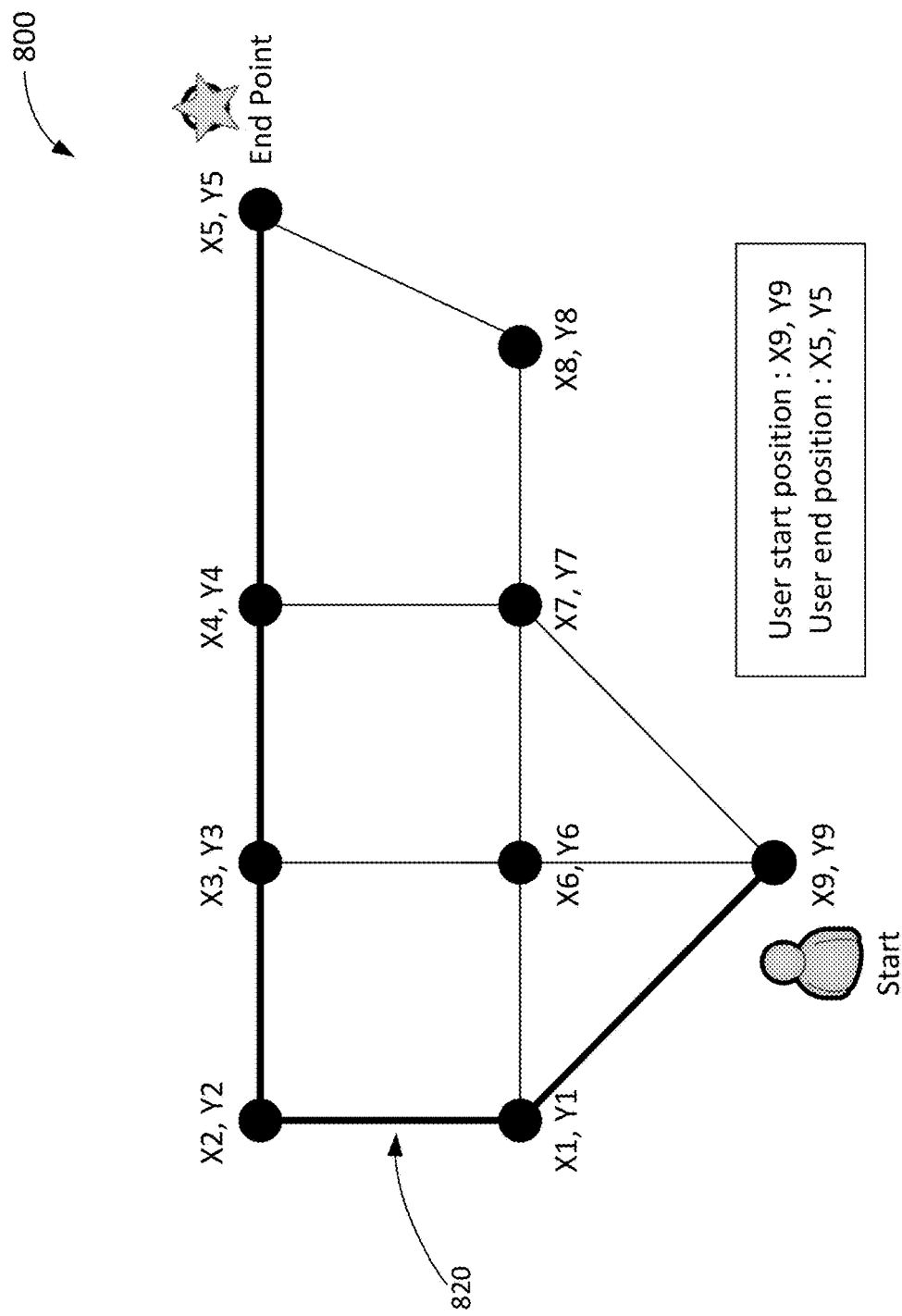
FIG. 8 depicts the route with minimum call drops between the starting position and the ending position of FIG. 6 in accordance with various embodiments.

Next referring to FIG. 8, path 820, the first path from left to right, traversing the entire perimeter, is the path with the minimum call drop. Referring to database 500 in FIG. 5, and consulting the percentage of call drops column 550, it is seen that although route segment X1,Y1 has 10% dropped calls, route segments X2,Y2, X3,Y3, X4,Y4 and X5,Y5 all have 0% call drops. Thus path 820 is the recommended choice.

Figure 9:
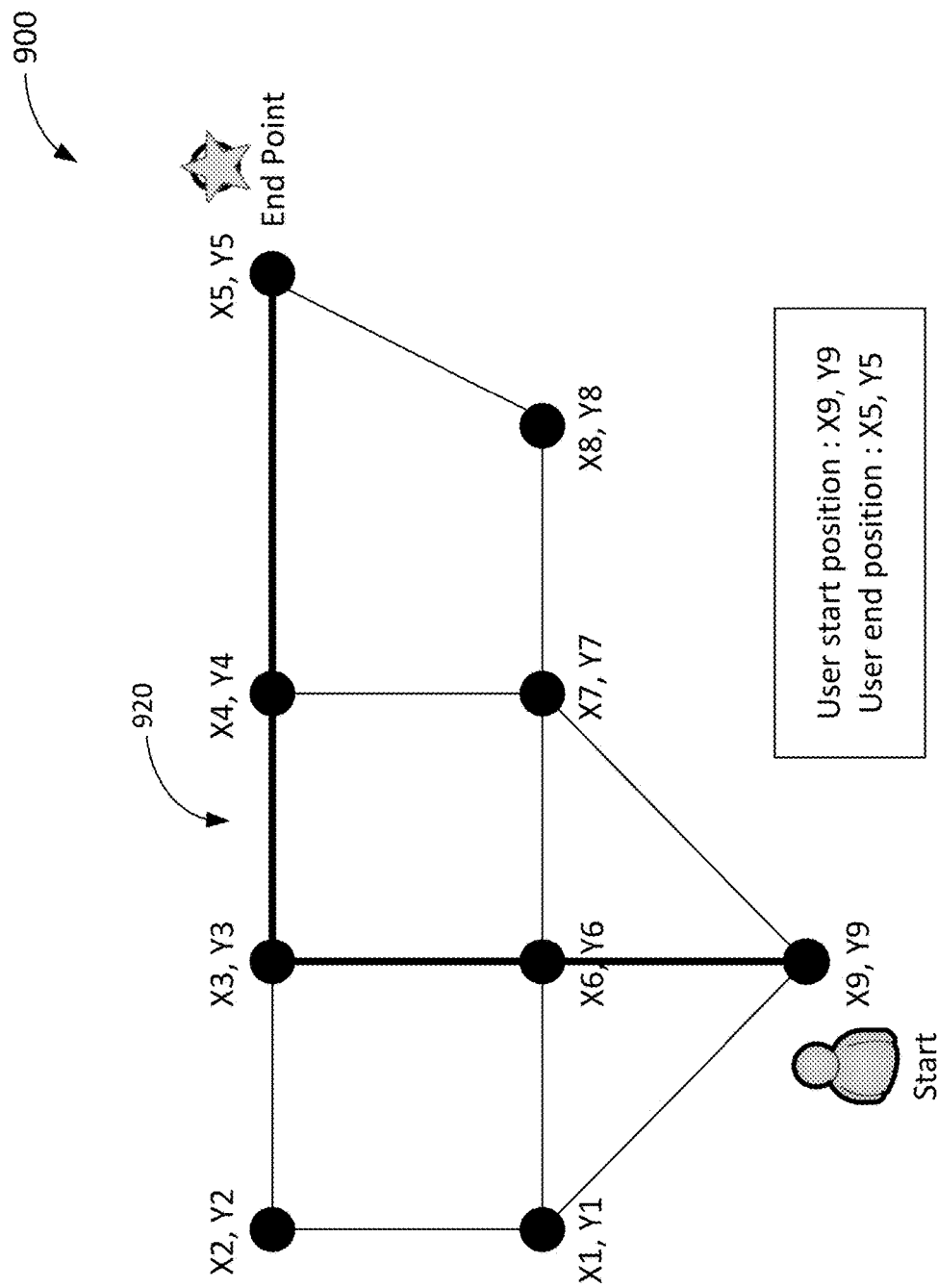
FIG. 9 depicts the route with the best data rates between the starting position and the ending position of FIG. 6 in accordance with various embodiments.

Next referring to FIG. 9, path 920, the second path from left to right, is the path with the best data rates. Referring again to database 500 in FIG. 5, and consulting the Data rates column 560, it is shown that the 4G network consistently has a higher data rate than either 2G or 3G networks. Thus, if the key criterion is highest data rates, those route segments that have, in the aggregate, the highest data rates between Start Point X9,Y9, and End Point X5,Y5 should be chosen. These route segments include X6,Y6 (data rate of 8000), X3,Y3 (data rate of 3000) and X4,Y4 (data rate of 6000). Because from X4,Y4 there is no choice as to how to get to the End Point, of course segment X5,Y5 must also be traversed. Thus, path 920 is the recommended choice.

Figure 10:
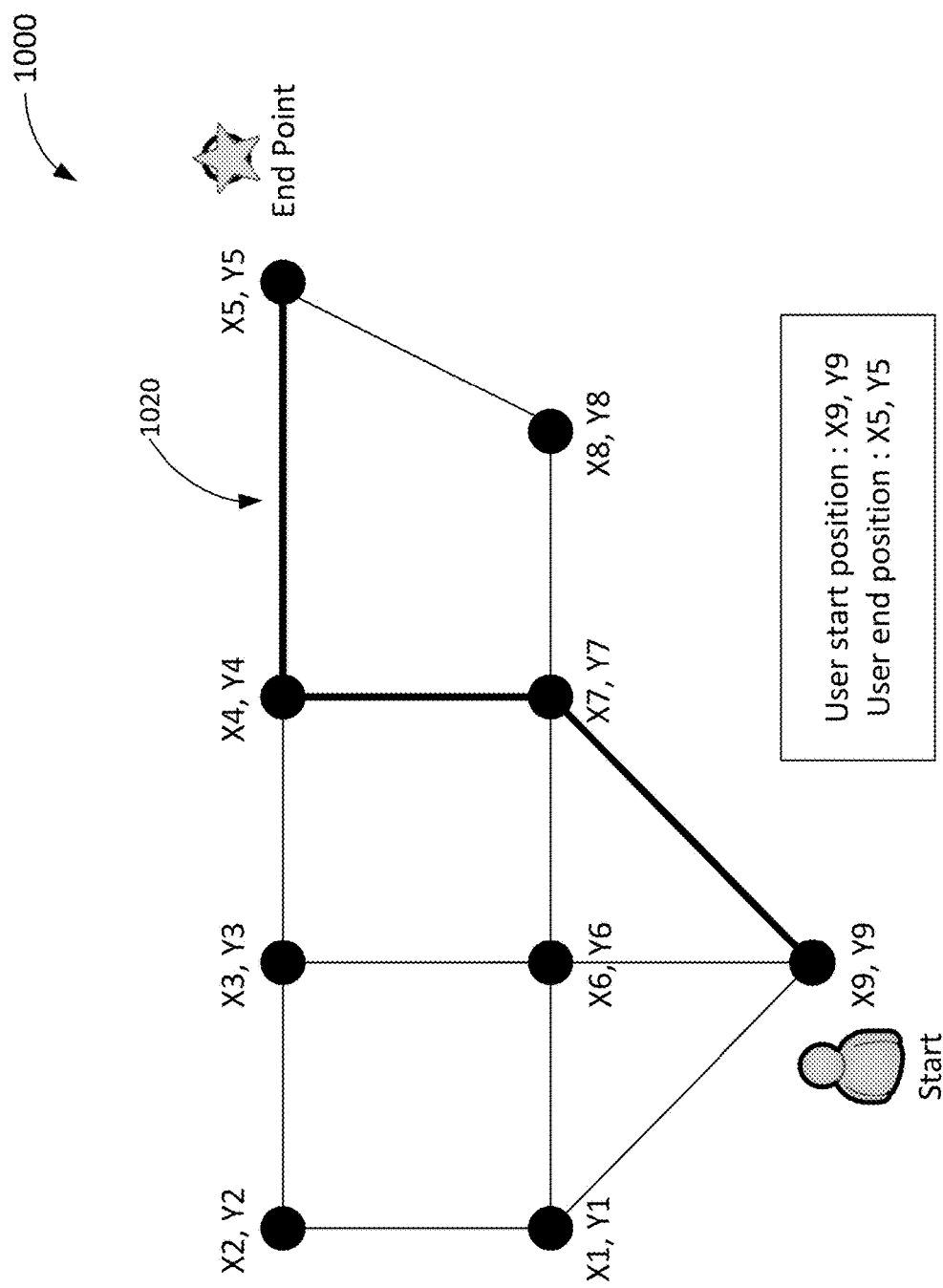
FIG. 10 depicts the route with best Evolved Multimedia Broadcast Multicast Services (EMBMS) availability between the starting position and the ending position of FIG. 6 in accordance with various embodiments.

Finally, referring to FIG. 10, path 1020, the third path from left to right, is the path with the best EMBMS support that is also the shortest. Referring again to database 500 in FIG. 5, and consulting the EMBMS column 530, it is seen that EMBMS is supported on all route segments except for those ending at data points X6,Y6 and X8,Y8. Thus, any path through those route segments must be rejected. That leaves two possible paths. Path 1020, and path 820 shown in FIG. 8. Both paths 820 and 1020 have full EMBMS support. However, path 820 is considerably longer than path 1020, and therefore, the EMBMS coverage being the same, the shorter possible path, path 1020, is the recommended choice. If the user had wanted both minimum call drop, and full EMBMS support, then path 820 would have been the recommended choice. It is noted that in some cases, there may be no route that perfectly matches a user's wireless connectivity preferences. In such cases a "best fit" route may be recommended, and the user advised of what segments of the best fit route provide which connectivity attributes, as shown, for example, in route 220 of FIG. 2, or the like.

Finally, as shown by the case of FIG. 10, where multiple paths each satisfy the user criteria, here EMBMS support, then an recommended path may be found by using standard navigational rules, such as, in this case of FIG. 10, choose the shortest path in distance or time. This illustrates the interplay between route determination engine 130 of FIG. 1, and an associated navigation application or system (not shown) with which system 101 may communicate on a UE or in a vehicle.

Thus, as exemplified in FIGS. 7-10, and based on the data in database 500 shown in FIG. 5, it is seen how given a change in user priorities or preferences as regards wireless connectivity, given the same set of possible routes, different ones of those possible routes will be recommended for different users, at different times.

Given the illustrative examples presented in FIGS. 7-10, FIG. 11 thus presents an overview of the operational flow of a process 1100 for determining an recommended route in response to a user request, in accordance with various embodiments.

Figure 11:
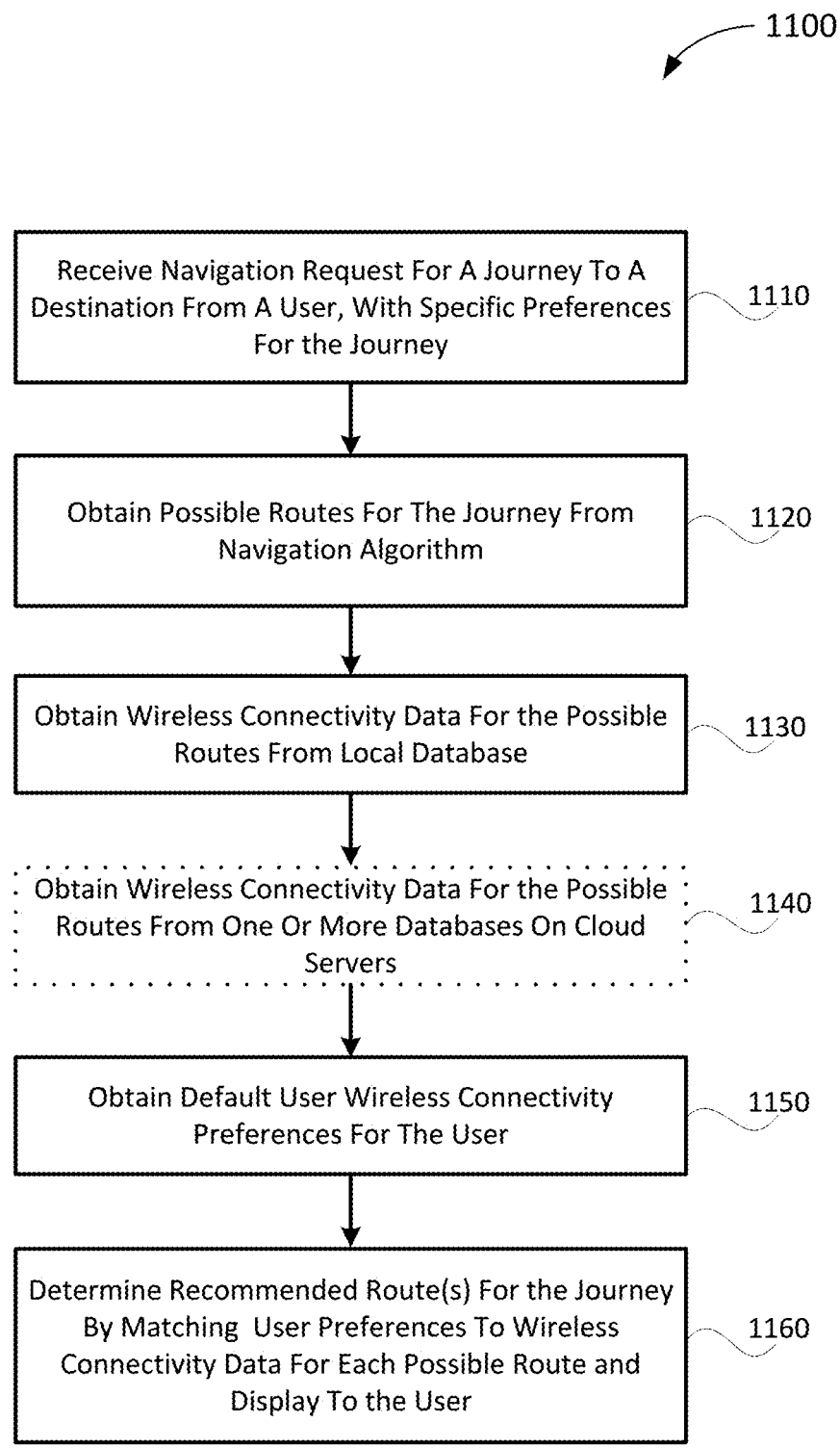
FIG. 11 illustrates an overview of the operational flow of a process for determining a recommended route in response to a user request in accordance with various embodiments.

With reference to FIG. 11, process 1100 may be performed by a system or apparatus according to various embodiments. In embodiments, process 1100 may be performed by an apparatus or a UE provided in a vehicle. In some embodiments, the apparatus may be a navigation system disposed in the vehicle. Process 1100 may include blocks 1110 through 1160. In alternate embodiments, process 1100 may have more or less operations, and some of the operations may be performed in different order.

Process 1100 may begin at block 1110, where an example system or apparatus may receive a navigation request for a journey to a destination from a user, along with specific user preferences regarding wireless connectivity on the journey. As noted above, in embodiments, user preferences may include type of network (e.g., 2G, 3G, 4G, NR), signal strength, maximum call drop rate, data rates, support of IMS Voice over packet switched domain (VOPS), support of EMBMS, preferred minimum average data rate throughout a route, priority of preferred access technology during a journey, or maximum allowed failures (call drops/loss of network/handover failures, etc.) during the journey. It is noted that these user preferences may be individually set at each user request for navigation assistance, or, for example, may be input by a user as default preferences, as described below, and occasionally overwritten for a specific journey, and thus input at block 1110.

From block 1110, process 1100 may proceed to block 1120, where possible routes for the journey to the destination may be obtained from a navigation algorithm. In embodiments, the navigation algorithm may be integrated with a system or apparatus according to various embodiments, or, for example, an example system or apparatus may be communicatively connected to an in-vehicle navigation system, or even integrated within it.

From block 1120, process 1100 may proceed to block 1130, where wireless connectivity data for each of the possible routes may be obtained from a local database. In embodiments, the local database may be a significantly expanded version of database 500, as shown in FIG. 5. The local database may include mobile network statistics that have been acquired and tagged with a GPS location. In embodiments, such statistics may include, for example, some or all of the data fields in each row of FIG. 5. It is noted that, in embodiments, a "local" database is one that is accessible by the system or apparatus performing process 1100 without a communications link over the cloud, or to a remote server. Thus, a local database may be accessed at any time, and such access is not dependent upon remote connectivity.

From block 1130, process 1100 may optionally proceed to block 1140, where additional wireless connectivity data and/or navigation data may be obtained for each of the proposed routes from one or more remote databases maintained on cloud servers. For example, it may be the case that one or more of the possible routes obtained in block 1120 from the navigation algorithm have not been particularly well traveled by a vehicle in which the system or apparatus performing process 1100 is provided. Or, for example, there may have been recent changes, such as, for example, a network provider increasing the level of service, type of network, or additional data services supported on one or more of the possible routes. Thus, a local database accessed in block 1130 may not have as complete data for such a route, and it may be useful to obtain additional supplemental wireless connectivity data from a remote database, such as, for example, Application Server Database 120, Network Operator Database 125, or User Group Database 127, as shown in FIG. 1 and described previously.

From block 1140, if it was performed, or if not, form block 1130, process 1100 may proceed to block 1150, where default user wireless connectivity preferences may be obtained. For example, the key discriminator for each of the chosen routes in FIGS. 8-10 is a preference that a given user values as a highest priority, such as, for example, lowest call drop rate, highest network level supported, and best EMBMS support. Each of these user preferences may be used to determine an recommended route for that user. User preferences, both as journey-specific settings, as in block 1110, or, for example, as default user preferences to be applied to every journey, unless overwritten for a specific journey, may include, for example, one or more of signal strength, percentage of call drops, availability of 2G, 3G or 4G networks, data rates for each available network, support of voice over packet switched domain (VOPS), and support of EMBMS.

Finally, from block 1150, process 1100 may proceed to block 1160, where an recommended connectivity route for the journey may be determined, by matching the user preferences, both journey specific from block 1110, and default from block 1150 (to the extent not changed or suspended temporarily by the journey specific user preferences) to the wireless connectivity for the set of possible routes. These routes may then be displayed to a user. For example, the recommended route may be provided on a display in a vehicle. In embodiments, if two or more of the possible routes are equally recommended for a user, for example, each providing substantially identical connectivity and each equally supporting user preferred data services, they may both be displayed to the user, who may then choose one.

At block 1160 process 1100 may terminate.

Figure 12:
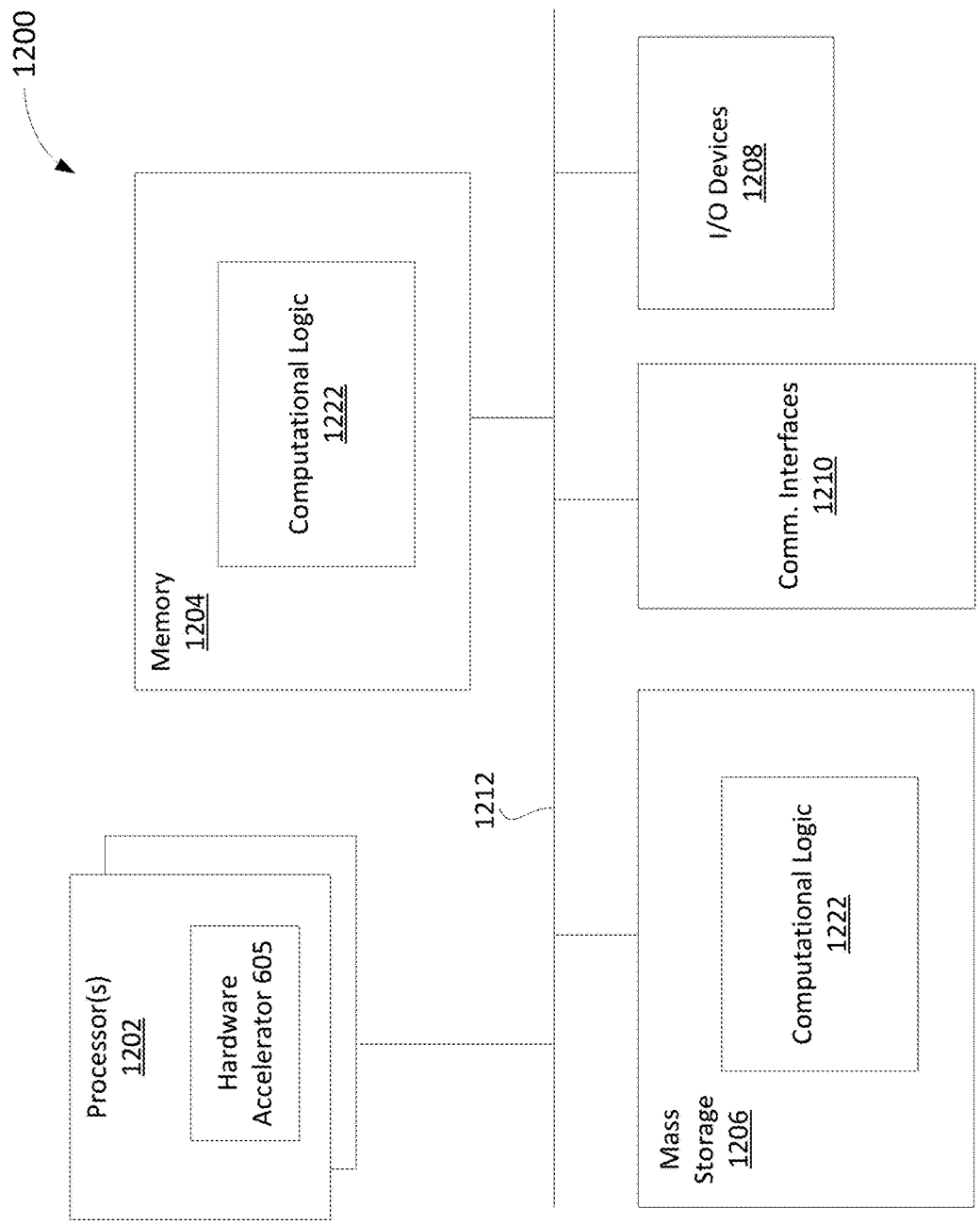
FIG. 12 illustrates a block diagram of a computer device suitable for practicing the present disclosure, in accordance with various embodiments.

Referring now to FIG. 12 wherein a block diagram of a computer device suitable for practicing the present disclosure, in accordance with various embodiments, is illustrated. As shown, computer device 1200 may include one or more processors 1202, memory controller 1203, and system memory 1204. Each processor 1202 may include one or more processor cores, and hardware accelerator 1205. An example of hardware accelerator 1205 may include, but is not limited to, programmed field programmable gate arrays (FPGA). In embodiments, processor 1202 may also include a memory controller (not shown). In embodiments, system memory 1204 may include any known volatile or non-volatile memory.

Additionally, computer device 1200 may include mass storage device(s) 1206 (such as solid state drives), input/output device interface 1208 (to interface with various input/output devices, such as, mouse, cursor control, display device (including touch sensitive screen), and so forth) and communication interfaces 1210 (such as network interface cards, modems and so forth). In embodiments, communication interfaces 1210 may support wired or wireless communication, including near field communication. The elements may be coupled to each other via system bus 1212, which may represent one or more buses. In the case of multiple buses, they may be bridged by one or more bus bridges (not shown).

Each of these elements may perform its conventional functions known in the art. In particular, system memory 1204 and mass storage device(s) 1206 may be employed to store a working copy and a permanent copy of the executable code of the programming instructions of an operating system, one or more applications, and/or various software implemented components of wireless connectvity routing system 101, collectively referred to as computing logic 1222. The programming instructions implementing computing logic 1222 may comprise assembler instructions supported by processor(s) 1202 or high-level languages, such as, for example, C, that can be compiled into such instructions. In embodiments, some of computing logic may be implemented in hardware accelerator 1205. In embodiments, part of computational logic 1222, e.g., a portion of the computational logic 1222 associated with the runtime environment of the compiler may be implemented in hardware accelerator 1205.

The permanent copy of the executable code of the programming instructions or the bit streams for configuring hardware accelerator 1205 may be placed into permanent mass storage device(s) 1206 and/or hardware accelerator 1205 in the factory, or in the field, through, for example, a distribution medium (not shown), such as a compact disc (CD), or through communication interface 1210 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 1210-1212 may vary, depending on the intended use of example computer device 1200, e.g., whether example computer device 1200 is a smartphone, tablet, ultrabook, a laptop, a server, a set-top box, a game console, a camera, and so forth. The constitutions of these elements 1210-1212 are otherwise known, and accordingly will not be further described.

Figure 13:
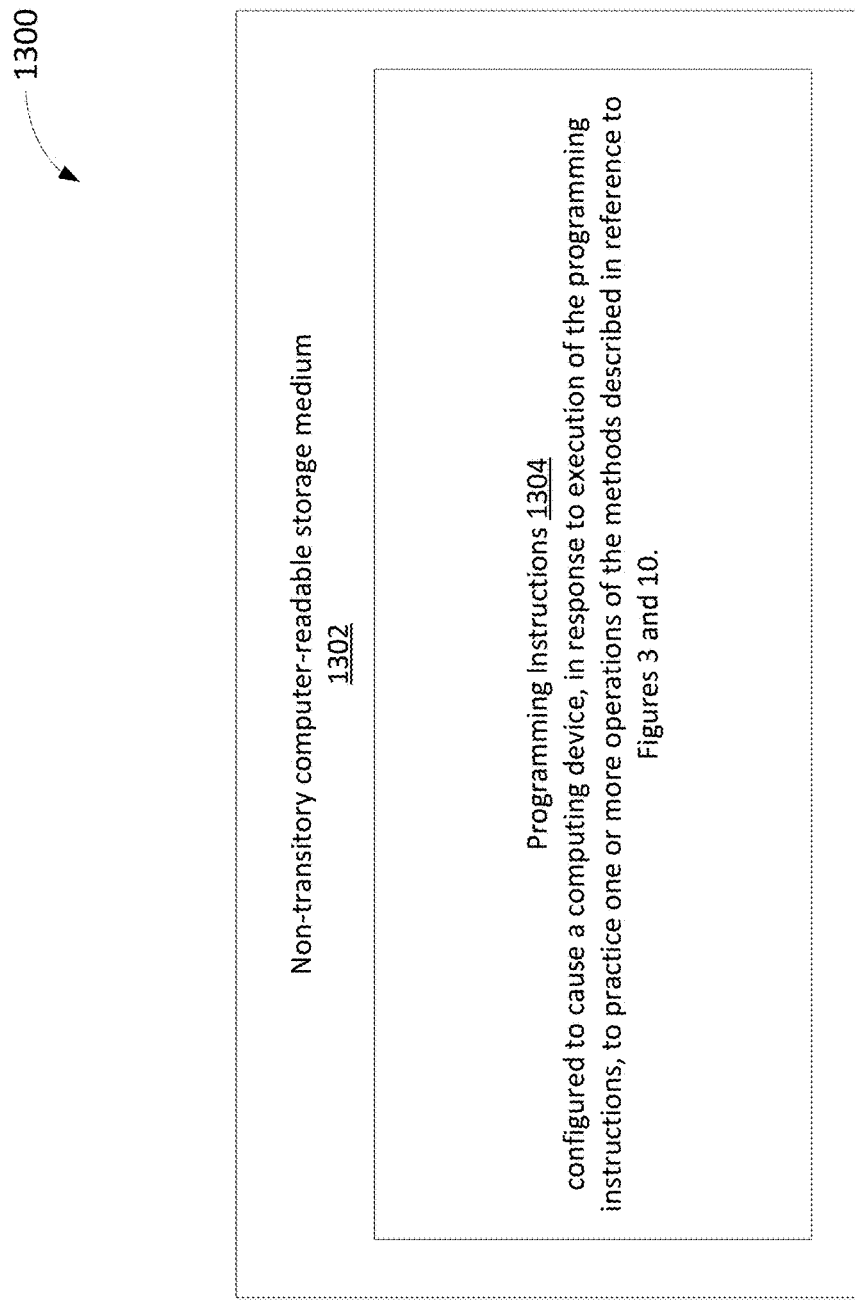
FIG. 13 illustrates an example computer-readable storage medium having instructions configured to practice aspects of the processes of FIGS. 3 and 11, in accordance with various embodiments.

FIG. 13 illustrates an example computer-readable storage medium having instructions configured to implement all (or portion of) software implementations of geotagged wireless connectivity scanners 105, UE database 110, user interface 115, route determination engine 130, and communications interface 135, and/or practice (aspects of) processes 300 of FIG. 3 and 1100 of FIG. 11, earlier described, in accordance with various embodiments. As illustrated, computer-readable storage medium 1202 may include the executable code of a number of programming instructions or bit streams 1204. Executable code of programming instructions (or bit streams) 1204 may be configured to enable a device, e.g., computer device 1200, in response to execution of the executable code/programming instructions (or operation of an encoded hardware accelerator 1205), to perform (aspects of) process 300 of FIG. 3. In alternate embodiments, executable code/programming instructions/bit streams 1204 may be disposed on multiple non-transitory computer-readable storage medium 1202 instead. In embodiments, computer-readable storage medium 1202 may be non-transitory. In still other embodiments, executable code/programming instructions 1204 may be encoded in transitory computer readable medium, such as signals.

Referring back to FIG. 12, for one embodiment, at least one of processors 1202 may be packaged together with a computer-readable storage medium having some or all of computing logic 1222 (in lieu of storing in system memory 1204 and/or mass storage device 1206) configured to practice all or selected ones of the operations earlier described with reference to FIGS. 3 and 11. For one embodiment, at least one of processors 1202 may be packaged together with a computer-readable storage medium having some or all of computing logic 1222 to form a System in Package (SiP). For one embodiment, at least one of processors 1202 may be integrated on the same die with a computer-readable storage medium having some or all of computing logic 1222. For one embodiment, at least one of processors 1202 may be packaged together with a computer-readable storage medium having some or all of computing logic 1222 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 may include an apparatus for providing wireless connectivity based routing for a vehicle, comprising: a user interface to receive one or more wireless connectivity preferences and a navigation request from a user and to display a recommended route to a destination for the user, the recommended route to meet the one or more wireless connectivity preferences while the vehicle follows the recommended route to the destination; a local database to store geotagged wireless connectivity data for various geolocations, collected by one or more geotagged wireless connectivity scanners of the vehicle; and a route determination engine coupled to the user interface and to the local database to determine the recommended route; wherein the user interface, the local database and the route determination engine are disposed in the vehicle.

Example 2 may include the apparatus of example 1, and/or other examples herein, further comprising a communications interface, coupled to the route determination engine, to obtain wireless connectivity data for the various geolocations or other geolocations from one or more remote databases.

Example 3 may include the apparatus of example 2, and/or other examples herein, wherein the one or more remote databases include databases maintained by an application server, databases provided by communications network operators, or user group databases.

Example 4 may include the apparatus of example 3, and/or other examples herein, wherein the user group databases store data from users having a specific type of wireless receiver or user equipment (UE).

Example 5 may include the apparatus of any one of examples 1-4, and/or other examples herein, wherein the apparatus is a navigation system disposed in the vehicle comprising the user interface, the local database and the route determination engine.

Example 6 may include the apparatus of any one of examples 1-4, and/or other examples herein, wherein the route determination engine interacts with a navigation application of the vehicle in at least one of: running on the apparatus, or communicatively coupled to the apparatus, to determine the recommended route.

Example 7 may include the apparatus of any one of examples 1-4, and/or other examples herein, wherein the route determination engine is further coupled to a navigation system of the vehicle.

Example 8 may include the apparatus of any one of examples 1-4, and/or other examples herein, wherein the apparatus further comprises the one or more geotagged wireless connectivity scanners.

Example 9 may include the apparatus of example 8, and/or other examples herein, wherein the geotagged wireless connectivity scanner acquires data one of continuously, or at a pre-determined frequency.

Example 10 may include the apparatus of example 8, and/or other examples herein, wherein the geotagged wireless connectivity scanner obtains data as to a given route or road segment initially continuously, and after a pre-defined quantity of data has been acquired for that route or road segment, periodically.

Example 11 may include the apparatus of example 8, and/or other examples herein, wherein the user interface is further to receive user commands regarding data acquisition parameters for the geotagged wireless connectivity scanner, and wherein the data acquisition parameters include when to operate the geotagged wireless connectivity scanner, which routes to operate it on, how often to update the data, and minimum quantity of data acquired in order to stop continuous data acquisition, or any combination of these.

Example 12 may include the apparatus of example 8, and/or other examples herein, wherein the apparatus is the vehicle.

Example 13 may include the apparatus of example 1, and/or other examples herein, wherein the wireless connectivity data includes mobile network statistics.

Example 14 may include the apparatus of example 13, and/or other examples herein, wherein the mobile network statistics include one or more of signal strength, percentage of call drops, availability of 2G, 3G or 4G networks, data rates for each available network, support of voice over packet switched domain (VOPS), and support of EMBMS.

Example 15 may include one or more non-transitory computer-readable storage media comprising a plurality of instructions that in response to being executed cause a computing device to: receive one or more wireless connectivity preferences and a navigation request to a destination from a user of the vehicle; store geotagged wireless connectivity data for various geolocations, collected by one or more geotagged wireless connectivity scanners of the vehicle; determine a recommended route to the destination, the recommended route to meet the one or more wireless connectivity preferences while the vehicle follows the recommended route to the destination; and display the recommended route to the destination to the user.

Example 16 may include the one or more non-transitory computer-readable storage media of example 15, and/or other examples herein, further comprising instructions that in response to being executed cause the computing device to obtain wireless connectivity data for the various geolocations or other geolocations from one or more remote databases.

Example 17 may include the one or more non-transitory computer-readable storage media of example 16, and/or other examples herein, wherein the one or more remote databases include databases maintained by an application server, databases provided by communications network operators, or user group databases.

Example 18 may include the one or more non-transitory computer-readable storage media of example 17, and/or other examples herein, wherein the user group databases store data from users having a specific type of wireless receiver or user equipment (UE).

Example 19 may include the one or more non-transitory computer-readable storage media of any one of examples 15-18, and/or other examples herein, disposed in a vehicle or an autonomous or semi-autonomous driving vehicle.

Example 20 may include the one or more non-transitory computer-readable storage media of any one of examples 15-18, and/or other examples herein, wherein the computing device interacts with a navigation application of the vehicle in at least one of: running on the computing device, or communicatively connected to the computing device, to determine the recommended route.

Example 21 may include the one or more non-transitory computer-readable storage media of any one of examples 15-18, and/or other examples herein, wherein the computing device is coupled to a navigation system of the vehicle.

Example 22 may include the one or more non-transitory computer-readable storage media of any one of examples 15-18, and/or other examples herein, further comprising instructions that in response to being executed cause the computing device to obtain geotagged wireless connectivity data at multiple points along one or more routes traveled by the vehicle.

Example 23 may include the one or more non-transitory computer-readable storage media of example 22, and/or other examples herein, wherein the geotagged wireless connectivity data is obtained one of continuously, or at a pre-determined frequency.

Example 24 may include the one or more non-transitory computer-readable storage media of example 22, and/or other examples herein, wherein the geotagged wireless connectivity data is obtained as to a given route or road segment initially continuously, and after a pre-defined quantity of data has been acquired for that route or road segment, periodically.

Example 25 may include the one or more non-transitory computer-readable storage media of example 22, and/or other examples herein, further comprising instructions that in response to being executed cause the computing device to receive user commands including data acquisition parameters for obtaining wireless connectivity data, and wherein the data acquisition parameters include when to obtain the geotagged wireless connectivity data, which routes to operate it on, how often to update the data, and minimum quantity of data acquired in order to stop continuous data acquisition, or any combination of these.

Example 26 may include the one or more non-transitory computer-readable storage media of any one of examples 15-18, and/or other examples herein, wherein the wireless connectivity data includes one or more of signal strength, percentage of call drops, availability of 2G, 3G or 4G networks, data rates for each available network, support of voice over packet switched domain (VOPS), and support of EMBMS.

Example 27 may include a method of determining a recommended route for a vehicle journey, comprising: receiving a navigation request for a vehicle journey from a user, the request including a destination and wireless connectivity preferences; obtaining possible routes to the destination by applying a navigation algorithm; obtaining wireless connectivity data for each of the possible routes from a database; determining a recommended route for the journey by, at least in part, matching the wireless connectivity preferences to the wireless connectivity data for each of the possible routes; and displaying the recommended route to the user.

Example 28 may include the method of example 27, and/or other examples herein, wherein the database contains geotagged wireless connectivity data for each of a set of geographical points along one or more routes or roadways.

Example 29 may include the method of example 28, and/or other examples herein, wherein the geotagged wireless connectivity data includes, for each geographical point in the database, one or more of signal strength, percentage of call drops, availability of 2G, 3G or 4G networks, data rates for each available network, support of voice over packet switched domain (VOPS), and support of EMBMS.

Example 30 may include the method of example 27, and/or other examples herein, wherein the database is local.

Example 31 may include the method of example 30, and/or other examples herein, further comprising obtaining additional wireless connectivity data from one or more remote databases.

Example 32 may include the method of example 31, and/or other examples herein, wherein the one or more remote databases include databases maintained by an application server, databases provided by communications network operators, or user group databases.

Example 33 may include the method of example 27, and/or other examples herein, further comprising receiving default wireless connectivity preferences for the user, wherein the determining the recommended route for the journey further including matching the default wireless connectivity preferences to the wireless connectivity data.

Example 34 may include one or more non-transitory computer-readable storage media comprising a plurality of instructions that in response to being executed cause a computing device to perform the method of any of examples 27-33.

Example 35 may include one or more non-transitory computer-readable storage media comprising a plurality of instructions that in response to being executed cause a computing device to: receive a navigation request for a vehicle journey from a user, the request including a destination and wireless connectivity preferences; obtain possible routes to the destination from a navigation algorithm; obtain wireless connectivity data for each of the possible routes from a database; determine a recommended route for the journey by matching the wireless connectivity preferences to the wireless connectivity data; and display the recommended route to the user.

Example 36 may include the one or more non-transitory computer-readable storage media of example 35, and/or other examples herein, wherein the database contains geotagged network wireless connectivity data for each of a set of geographical points along one or more routes or roadways.

Example 37 may include the one or more non-transitory computer-readable storage media of example 36, and/or other examples herein, wherein the geotagged network wireless connectivity data includes, for each geographical point in the database, one or more of signal strength, percentage of call drops, availability of 2G, 3G or 4G networks, data rates for each available network, support of voice over packet switched domain (VOPS), and support of EMBMS.

Example 38 may include the one or more non-transitory computer-readable storage media of example 35, and/or other examples herein, wherein the database is local.

Example 39 may include the one or more non-transitory computer-readable storage media of example 38, and/or other examples herein, further comprising instructions that in response to being executed cause the computing device to obtain additional wireless connectivity data from one or more remote databases.

Example 40 may include the one or more non-transitory computer-readable storage media of example 39, and/or other examples herein, wherein the one or more remote databases include databases maintained by an application server, databases provided by communications network operators, or user group databases.

Example 41 may include the one or more non-transitory computer-readable storage media of example 35, and/or other examples herein, further comprising instructions that in response to being executed cause the computing device to receive default wireless connectivity preferences for the user, and to determine the recommended route for the journey by matching the default wireless connectivity preferences to the wireless connectivity data.

Example 42 may include an apparatus for computing, comprising: means to receive wireless connectivity preferences and a navigation request from a user of a vehicle and to display a recommended route to a destination for the user, the recommended route to meet the one or more wireless connectivity preferences while the vehicle follows the recommended route to the destination; means to store geotagged wireless connectivity data for various geolocations, collected by one or more means to scan geotagged wireless connectivity data; and means to determine a recommended route coupled to the means to receive and to the means to store, wherein the means to receive, the means to store, and the means to determine are disposed in the vehicle.

Example 43 may include the apparatus for computing of example 42, and/or other examples herein, further comprising communication means, coupled to the means to determine, to obtain wireless connectivity data from one or more remote storage means, and wherein the means to determine is further to determine the recommended route based, at least in part, on the additional wireless connectivity data.

Example 44 may include the apparatus for computing of example 43, and/or other examples herein, wherein the one or more remote storage means include storage means maintained by an application server, storage means provided by communications network operators, or storage means maintained by a user group.

Example 45 may include the apparatus for computing of example 44, and/or other examples herein, wherein the storage means maintained by the user group stores data from users having a specific type of wireless receiver or user equipment (UE).

Example 46 may include the apparatus for computing of any one of examples 42-45, and/or other examples herein, wherein the apparatus for computing is a navigation system disposed in the vehicle comprising the means to receive, the means to store, and the means to determine.

Example 47 may include the apparatus for computing of any one of examples 42-45, and/or other examples herein, wherein the means to determine interacts with a navigation application of the vehicle in at least one of: running on the apparatus for computing, or communicatively coupled to the apparatus for computing, to determine the recommended route.

Example 48 may include the apparatus for computing of example 47, and/or other examples herein, wherein the means to determine is further coupled to a navigation system of the vehicle.

Example 49 may include the apparatus for computing of any one of example 42-45, and/or other examples herein, further comprising the one or more means to scan geotagged wireless connectivity data.

Example 50 may include the apparatus for computing of example 49, and/or other examples herein, wherein the means to scan wireless connectivity data acquires data one of continuously, or at a pre-determined frequency.

Example 51 may include the apparatus for computing of example 49, and/or other examples herein, wherein the means to scan geotagged wireless connectivity data scans data as to a given route or road segment initially continuously, and after a pre-defined quantity of data has been acquired for that route or road segment, periodically.

Example 52 may include the apparatus for computing of example 42, and/or other examples herein, wherein the means to receive is further to receive user commands regarding data acquisition parameters for the means to scan wireless connectivity data, and wherein the data acquisition parameters include when to operate the means to scan geotagged wireless connectivity data, which routes to operate it on, how often to update the data, and minimum quantity of data acquired in order to stop continuous data acquisition, or any combination of these.

Example 53 may include the apparatus for computing of example 42, and/or other examples herein, wherein the wireless connectivity data includes mobile network statistics.

Example 54 may include the apparatus for computing of example 53, and/or other examples herein, wherein the mobile network statistics include one or more of signal strength, percentage of call drops, availability of 2G, 3G or 4G networks, data rates for each available network, support of voice over packet switched domain (VOPS), and support of EMBMS.

Example 55 may include an apparatus for computing, comprising: means to receive a navigation request for a vehicle journey from a user, the request including a destination and wireless connectivity preferences; means to obtain possible routes to the destination by applying a navigation algorithm; means to obtain wireless connectivity data for each of the possible routes from a database coupled to the apparatus for computing; means to determine a recommended route for the journey by at least in part, matching the wireless connectivity preferences to the wireless connectivity data for each of the possible routes; and means for displaying the recommended route to the user.

Example 56 may include the apparatus for computing of example 55, and/or other examples herein, wherein the database contains geotagged network wireless connectivity data for each of a set of geographical points along one or more routes or roadways.

Example 57 may include the apparatus for computing of example 56, and/or other examples herein, wherein the geotagged network wireless connectivity data includes, for each geographical point in the database, one or more of signal strength, percentage of call drops, availability of 2G, 3G or 4G networks, data rates for each available network, support of voice over packet switched domain (VOPS), and support of EMBMS.

Example 58 may include the apparatus for computing of either of example 55 or 56, and/or other examples herein, wherein the database is local.

Example 59 may include the apparatus for computing of example 55, and/or other examples herein, the means to obtain further to obtain additional wireless connectivity data from one or more remote databases.

Example 60 may include the apparatus for computing of example 59, and/or other examples herein, wherein the one or more remote databases include databases maintained by an application server, databases provided by communications network operators, or user group databases.

Example 61 may include the apparatus for computing of example 55, and/or other examples herein, the means to receive further to receive default wireless connectivity preferences from the user, and the means to determine further to match the default wireless connectivity preferences to the wireless connectivity data.

What is claimed is:

1. An apparatus for providing wireless connectivity based routing for a vehicle, comprising:
    a user interface configured to receive one or more specifications of wireless connectivity services of interest, the one or more specifications of wireless connectivity services of interest being associated with wireless content services of interest on a trip to a destination, wherein the user interface is further configured to receive a navigation request to the destination, and to display a recommended route to the destination;
    a communications interface, configured to obtain external geotagged wireless connectivity data for various geolocations or other geolocations from one or more remote databases;
    a local database configured to (a) store local geotagged wireless connectivity data for the various geolocations, collected by one or more geotagged wireless connectivity scanners disposed in the vehicle, and (b) store the obtained external geotagged wireless connectivity data for the various geolocations or the other geolocations from the one or more remote databases; and
    a route determination engine coupled to the user interface, the communications interface, and the local database, configured to locally determine the recommended route to be displayed by the user interface in view of the one or more specifications of wireless connectivity services of interest on the trip to the destination and the local geotagged wireless connectivity data for the various geolocations stored in the local database without being dependent on availability of the external geotagged wireless connectivity data for the various geolocations or the other geolocations obtained via the communications interface;
    wherein the route determination engine is further configured to locally determine when one or more geolocations along the recommended route: (a) are absent from one or both of the local geotagged wireless connectivity data and/or the external geotagged wireless connectivity data, (b) comprise less than a pre-defined quantity of the local geotagged wireless connectivity data and/or the external geotagged wireless connectivity data, or (c) are different beyond a external geotagged wireless connectivity data, and when one or more of (a), (b), or (c) occur, the route determination engine controls the one or more geotagged wireless connectivity scanners to collect additional local geotagged wireless connectivity data at each of the one or more geolocations while the vehicle is located at the one or more geolocations, the local database is further configured to store the additional local geotagged wireless connectivity data, and the communications interface is further configured to transmit the additional local geotagged wireless connectivity data to the one or more remote databases; and
    wherein the user interface, the local database, the communications interface, and the route determination engine are disposed in the vehicle.

2. The apparatus of claim 1, wherein the one or more remote databases are maintained by one or more of an application server, communications network operators, and/or user groups.

3. The apparatus of claim 2, wherein the one or more remote databases are maintained by at least user groups and store data from users having a specific type of wireless receiver or user equipment (UE).

4. The apparatus of claim 1, wherein the apparatus is a navigation system disposed in the vehicle comprising the user interface, the local database, the communications interface, and the route determination engine.

5. The apparatus of claim 1, wherein the route determination engine interacts with a navigation application disposed in the vehicle in at least one of: running on the apparatus, or communicatively coupled to the apparatus, to determine the recommended route.

6. The apparatus of claim 5, wherein the route determination engine is further coupled to a navigation system disposed in the vehicle.

7. The apparatus of claim 1, wherein the apparatus further comprises the one or more geotagged wireless connectivity scanners.

8. The apparatus of claim 7, wherein the one or more geotagged wireless connectivity scanners acquire the local geotagged wireless connectivity data and/or the additional local geotagged wireless connectivity data by one of: continuously, or at a pre-determined frequency.

9. The apparatus of claim 7, wherein the one or more geotagged wireless connectivity scanners obtain the local geotagged wireless connectivity data and/or the additional local geotagged wireless connectivity data for a given route or road segment initially continuously, and after the pre-defined quantity of the local geotagged wireless connectivity data and/or the additional local geotagged wireless connectivity data has been acquired for that given route or road segment, periodically.

10. The apparatus of claim 9, wherein the user interface is further configured to receive user commands regarding data acquisition parameters for the one or more geotagged wireless connectivity scanners, and wherein the data acquisition parameters include one or more of the following: when to operate the geotagged wireless connectivity scanners, which routes to operate the geotagged wireless connectivity scanners on, how often to update the local geotagged wireless connectivity data and/or the additional local geotagged wireless connectivity data, or a minimum quantity to set as the pre-defined quantity required in order to stop continuous data acquisition.

11. The apparatus of claim 1, wherein the wireless connectivity data includes mobile network statistics.

12. The apparatus of claim 11, wherein the mobile network statistics include one or more of: signal strength, percentage of call drops, availability of 2G, 3G, or 4G networks, data rates for each available network, support of voice over packet switched domain (VOPS), or support of Evolved Multimedia Broadcast Multicast Services (EM-BMS).

13. One or more non-transitory computer-readable storage media comprising a plurality of instructions that in response to being executed cause a computing device disposed in a vehicle, to:
receive one or more specifications of wireless connectivity services of interest, and a navigation request to a destination, the wireless connectivity services of interest being associated with wireless content services of interest on a trip to the destination;
obtain, from one or more remote databases, external geotagged wireless connectivity data for various geolocations or other geolocations;
store, at a local database within the vehicle, (a) local geotagged wireless connectivity data for the various geolocations, collected by one or more geotagged wireless connectivity scanners disposed in the vehicle, and (b) store the obtained external geotagged wireless connectivity data for the various geolocations or the other geolocations from one or more remote databases;
determine, at the vehicle, a recommended route to the destination in view of the one or more specifications of wireless connectivity services of interest on the trip to the destination and the local geotagged wireless connectivity data for the various geolocations stored in the local database without being dependent on availability of the external geotagged wireless connectivity data for the various geolocations or the other geolocations obtained via the one or more remote databases;
display, at the vehicle, the recommended route to the destination;
determine, at the vehicle, when one or more geolocations along the recommended route: (a) are absent from one or both of the local geotagged wireless connectivity data and/or the external geotagged wireless connectivity data, (b) comprise less than a pre-defined quantity of the local geotagged wireless connectivity data and/or the external geotagged wireless connectivity data, or (c) are different beyond a difference threshold when comparing the local geotagged wireless connectivity data and the external geotagged wireless connectivity data; and
when one or more of (a), (b), or (c) occur:
control, at the vehicle, the one or more geotagged wireless connectivity scanners to collect additional local geotagged wireless connectivity data at each of the one or more geolocations while the vehicle k located at the one or more geolocations,
store, at the vehicle, the additional local geotagged wireless connectivity data within the local database, and
transmit at the vehicle the additional local geotagged wireless connectivity data to the one or more remote databases.

14. The one or more non-transitory computer-readable storage media of claim 13, wherein the one or more remote databases are maintained by one or more of an application server, communications network operators, and/or user groups.

15. The one or more non-transitory computer-readable storage media of claim 14, wherein the one or more remote databases are maintained by at least user groups and store data from users having a specific type of wireless receiver or user equipment (UE).

16. The one or more non-transitory computer-readable storage media of claim 13, wherein the computing device operates a navigation application to determine the recommended route.

17. The one or more non-transitory computer-readable storage media of claim 13, wherein at least one of: the local geotagged wireless connectivity data and/or the additional local geotagged wireless connectivity is obtained by one of: continuously, at a pre-determined frequency, or initially continuously, and after the pre-defined quantity of the local geotagged wireless connectivity data and/or the additional local geotagged wireless connectivity data has been acquired for a given route or road segment, periodically.

18. The one or more non-transitory computer-readable storage media of claim 17, wherein the one or more non-transitory computer-readable storage media further comprise instructions that in response to being executed cause the computing device to receive user commands including data acquisition parameters for obtaining the local geotagged wireless connectivity data and or the additional local geotagged wireless connectivity data, and wherein the data acquisition parameters include one or more of the following: when to obtain the local geotagged wireless connectivity data and/or the additional local geotagged wireless connectivity data, which routes to operate the geotagged wireless connectivity scanners on, how often to update the local geotagged wireless connectivity data and/or the additional local geotagged wireless connectivity data, or a minimum quantity to set as the pre-defined quantity required in order to stop continuous data acquisition.

19. A method of determining a recommended route for a vehicle journey, comprising:

storing, within a local database disposed in a vehicle, local wireless connectivity data collected by one or more wireless connectivity scanners disposed in the vehicle and route data usable by a navigation algorithm;

obtaining, from one or more remote databases, external wireless connectivity data for the route data usable by the navigation algorithm;

storing, within the local database disposed in the vehicle, the external wireless connectivity data;

receiving, at the vehicle, a navigation request for the vehicle journey from a user of the vehicle, the navigation request including a destination and wireless connectivity services of interest, the wireless connectivity services of interest being associated with wireless content services of interest on the journey to the destination;

obtaining, at the vehicle, possible routes to the destination by applying the navigation algorithm to the route data within the local database;

obtaining, at the vehicle, the local wireless connectivity data stored in the local database for each of the possible routes obtained from the local database;

determining, at the vehicle, a recommended route for the journey by, at least in part, matching the wireless connectivity services of interest to the local wireless connectivity data for each of the possible routes obtained from the local database, without being dependent on availability of the external wireless connectivity data for the route data usable by the navigation algorithm obtained from the one or more remote databases;

displaying, at the vehicle, the recommended route;

determining, at the vehicle, when one or more geographical points along the recommended route: (a) are absent from one or both of the local wireless connectivity data and/or the external wireless connectivity data, (b) comprise less than a pre-defined quantity of the local wireless connectivity data and/or the external wireless connectivity data, or (c) are different beyond a difference threshold when comparing the local wireless connectivity data and the external wireless connectivity data; and when one or more of (a), (b), or (c) occur:
control, at the vehicle, the one or more wireless connectivity scanners to collect additional local wireless connectivity data at each of the one or more geographical points while the vehicle is located at the one or more geographical points, store, at the vehicle, the additional local wireless connectivity data within the local database, and transmit, at the vehicle, the additional local wireless connectivity data to the one or more remote databases.

20. The method of claim 19, wherein the local wireless connectivity data and or the external wireless connectivity data collected by the one or more wireless connectivity scanners disposed in the vehicle is stored in the local database in association with each of a set of geographical points along one or more routes or roadways comprising the route data.

21. The method of claim 20, further comprising receiving, at the vehicle, default wireless connectivity services of interest, wherein determining the recommended route for the journey further includes matching the default wireless connectivity services of interest to the local wireless connectivity data and/or the external wireless connectivity data collected by the one or more wireless connectivity scanners disposed in the vehicle.

* * * * *

UNITED STATES PATENT AND TRADEMARK OFFICE
CERTIFICATE OF CORRECTION

| | | |
|---|---|---|
| PATENT NO. | : 10,921,141 B2 | Page 1 of 1 |
| APPLICATION NO. | : 15/814830 | |
| DATED | : February 16, 2021 | |
| INVENTOR(S) | : Arjun R Shetty et al. | |

It is certified that error appears in the above-identified patent and that said Letters Patent is hereby corrected as shown below:

In the Claims

Column 24
Line 55, "...and or..." should read – "...and/or..."

Column 26
Line 20, "...and or..." should read – "...and/or..."

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*